United States Patent
Hall et al.

(10) Patent No.: US 11,667,227 B2
(45) Date of Patent: Jun. 6, 2023

(54) TRUCK BODIES

(71) Applicant: Austin Engineering Limited, Milton (AU)

(72) Inventors: Jamie Vincent Clarke Hall, Kalamunda (AU); Lyndon Brian Greeshaw, Yokine (AU)

(73) Assignee: Austin Engineering Limited

( * ) Notice: Subject to any disclaimer, the term of this patent is extended or adjusted under 35 U.S.C. 154(b) by 176 days.

(21) Appl. No.: 16/804,551

(22) Filed: Feb. 28, 2020

(65) Prior Publication Data

US 2021/0114504 A1    Apr. 22, 2021

(30) Foreign Application Priority Data

Oct. 21, 2019    (AU) ................ 2019253774

(51) Int. Cl.
  *B60P 1/28*    (2006.01)

(52) U.S. Cl.
  CPC .................... *B60P 1/286* (2013.01)

(58) Field of Classification Search
  CPC .. B60P 1/286; B60P 1/28; B60P 1/283; B60P 1/16
  USPC .......... 298/7.17 R, 19 R, 22 R, 22 P, 7, 17 R
  See application file for complete search history.

(56) References Cited

U.S. PATENT DOCUMENTS

| | | |
|---|---|---|
| D118,033 S | 12/1939 | Alexander |
| D172,979 S | 9/1954 | Mortag |
| D189,025 S | 10/1960 | Acker |
| D190,023 S | 4/1961 | Parsley et al. |
| D198,841 S | 8/1964 | Simmons et al. |
| D204,604 S | 5/1966 | Fryer |
| D206,708 S | 1/1967 | Maxon, Jr. |
| 3,521,930 A | 7/1970 | Tucker |
| D268,830 S | 5/1983 | Sutela |
| D289,748 S | 5/1987 | Proeschl |
| 5,460,431 A * | 10/1995 | McWilliams ........... B60P 1/286 298/17 B |
| D386,128 S | 11/1997 | Gerding et al. |

(Continued)

FOREIGN PATENT DOCUMENTS

| | | |
|---|---|---|
| AU | 332686 S | 9/2010 |
| AU | 2012213921 A1 | 9/2013 |

(Continued)

OTHER PUBLICATIONS

Search Report for Chilean Application No. 202000495 dated Mar. 22, 2021; 3 pages.

(Continued)

*Primary Examiner* — Stephen T Gordon
(74) *Attorney, Agent, or Firm* — Lerner David LLP

(57) ABSTRACT

A truck body is disclosed which is able to be mounted to a truck in such a way that the truck body can pivot relative to the truck between a lowered, travel orientation and a raised, dumping orientation. The truck body has a material carrying region, and the material carrying region has: a floor surface, and a curved transition ("the floor-to-front-wall-transition") between the floor surface and a surface forming a front wall portion of the material carrying region. The radius of curvature of at least a portion of the floor-to-front-wall-transition is two meters or greater, which may help to reduce material carry-back.

13 Claims, 3 Drawing Sheets

(56) References Cited

U.S. PATENT DOCUMENTS

| | | |
|---|---|---|
| D386,722 S | 11/1997 | Dunphy |
| 5,772,271 A | 6/1998 | Sanders |
| D409,524 S | 5/1999 | McKinney |
| D414,138 S | 9/1999 | McKinney |
| D425,825 S | 5/2000 | Shambeau et al. |
| D429,662 S | 8/2000 | Smith et al. |
| D431,498 S | 10/2000 | Smith et al. |
| D450,627 S | 11/2001 | Musso et al. |
| D466,135 S | 11/2002 | Spomer et al. |
| D476,999 S | 7/2003 | Truan et al. |
| D606,565 S | 12/2009 | Hickenbottom |
| D649,168 S | 11/2011 | Hall |
| 2003/0015906 A1 | 1/2003 | Mistler |
| 2003/0080603 A1 | 5/2003 | Connor |
| 2003/0156933 A1 | 8/2003 | Arne et al. |
| 2005/0115795 A1 | 6/2005 | Bailey |
| 2009/0315387 A1 | 12/2009 | Smith |
| 2013/0234468 A1 | 9/2013 | Hall |
| 2014/0054925 A1 | 2/2014 | Hyde et al. |
| 2014/0333090 A1 | 11/2014 | Garcia-Huidobro Valdivieso |
| 2015/0001910 A1* | 1/2015 | Natarajan ............... B60P 1/286 298/1 H |
| 2020/0180522 A1* | 6/2020 | Larsson ................. B60P 1/286 |

FOREIGN PATENT DOCUMENTS

| | | |
|---|---|---|
| AU | 2010332139 B2 | 7/2014 |
| AU | 201815225 S | 5/2019 |
| AU | 201912455 S | 6/2019 |
| AU | 201912456 S | 6/2019 |
| AU | 201912457 S | 6/2019 |
| AU | 201912459 S | 6/2019 |
| CL | 42705 B | 7/2006 |
| CL | 2011003363 A1 | 7/2012 |
| WO | 2012103664 A1 | 8/2012 |

OTHER PUBLICATIONS

Hercules Tray from DT Australia, pp. 6-7, available as early as Jul. 22, 2019 (Machine generated translation is attached).

* cited by examiner

TRUCK BODIES

CROSS REFERENCE TO RELATED APPLICATIONS

This application claims priority from Australian Patent Application No. 2019253774 filed 21 Oct. 2019, the entire disclosure of which is incorporated herein by reference.

This application is related to U.S. Design Pat. application No. 29/710,442 filed 23 Oct. 2019, the entire disclosure of which is incorporated herein by reference.

TECHNICAL FIELD

The present invention relates to truck bodies, and in particular (although not necessarily exclusively) bodies for dump trucks used in mining and other heavy earthmoving applications.

BACKGROUND

In open cut mining, large construction projects and other industrial applications which involve heavy earthmoving, earthen material (which may or may not contain valuable ore or some other valuable commodity but) which has been excavated from an excavation site e.g. by a dragline, hydraulic excavator or some other piece of excavating equipment operating at the excavation site, must often be transported from the excavation site to another location some distance away. This may be for e.g. storage of the excavated material, or for use of the excavated material at the new location (e.g. as infill), or for further processing of the excavated material (e.g. for feeding into a crusher), etc. For ease of reference, the destination location to which the excavated material is taken (regardless of whether this is simply for storage, or for further processing or for any other purpose) after it has been excavated (dug up) from the original excavation site will be referred to herein as the "dump site".

Dump trucks are commonly used to transport excavated material from an excavation site to a dump site. Usually, when the earthen material is excavated by an excavator at the excavation site, the material excavated (dug up) in each "pass" or "digging cycle" of the excavator is emptied/dumped out of the excavator bucket directly into the body (or tray) of a waiting dump truck. Note that, in this specification, the terms "truck body" or simply "body", and "truck tray" or simply "tray", respectively, may be treated as synonymous and refer to the part of the dump truck that receives excavated material and in which the excavated material is held while being transported by the dump truck.

On dump trucks, the truck body is typically pivotally attached to the chassis (or some other frame) of the truck, and an hydraulic (or other) lifting mechanism is usually provided so that, when a dump truck loaded with excavated material reaches the dump site where the material is to be deposited/unloaded, the truck tray/body can be pivotally raised (tipped up) relative to the rest of the truck. More specifically, the front end of the body is typically raised relative to the rear end of the body so as to "dump" the material from the truck body out onto the ground at the dump site. That is, when the truck body is raised so that the front-end of the body rises relative to the rear end of the body, this causes the excavated material therein to slide out onto the ground.

It is generally very important in most mining, construction and other heavy earthmoving applications, to maximise the amount of excavated material carried by a dump truck in each load it takes from an excavation site to a dump site. Maximising the amount of the material transported in each truck load (is a part of what) helps to ensure that as much excavated material as possible is conveyed from the excavation site to the dump site in a given amount of time, and this in turn (is part of what) helps to maximise (or at least achieve or maintain high levels of) productivity. However, there are also often limits on the amount of material that can be transported by a truck in a single load. For instance, it is sometimes only permissible to partially fill the truck body for each (or for a given) load carried by the truck. This may occur, for example, if the overall density of the excavated material to be transported is sufficiently high that, even though the volume of the excavated material in the truck body may not completely fill the truck body's material carrying region or volumetric carrying capacity, nevertheless loading any more of the material into the body would cause the total weight of the material to exceed the truck's total weight carrying limit. Such weight-overloading of the truck (i.e. loading of an amount of material into the truck body that would exceed the truck's rated or safe weight/mass carrying limit) must generally be avoided for a number of reasons including (but not limited to) the following. Transporting a weight/mass of material in the truck which is greater than the truck's safe or rated weight carrying limit may cause damage or excessive wear to parts of the truck including the body (tray), the engine/propulsion and drivetrain systems, tyres, the chassis and/or supporting frame(s) of the truck, suspension other structural components, etc, and also to roads on which the truck travels. Such weight-overloading may also lead to increased or excessive fuel consumption. Furthermore, such weight-overloading of the truck is potentially dangerous as it may cause parts of the truck to fail, or it may cause the truck to be dangerous or unstable, all of which may potentially expose the driver and/or other personnel in the vicinity to the risk of injury or death.

There are also situations in which the overall density of the excavated material to be transported by a dump truck (between an excavation site and a dump site) is sufficiently low that the entire material carrying region or volumetric carrying capacity of the truck body (tray) can be filled with the material without exceeding the truck's safe or rated weight/mass carrying limit. There may even be instances where the truck body's volume (or material carrying region or volumetric carrying capacity) can be completely filled with the material and yet the total weight of the material therein may still be less than the truck's weight carrying limit. In such situations, there may sometimes be a temptation by excavator operators to load (or a temptation by truck operators to allow the loading of) a volume of material from the excavator into the truck body which is greater than the rated volume carrying capacity (volumetric carrying capacity) of the truck body, particularly if such a volume-overloading does not cause the material (or too much of the material) to spill out of the truck body onto the ground at the excavation site or en route to the dump site. However, in these situations, even if the weight of the material in the truck body does not exceed the weight-carrying limit of the truck, if the volume of material in the truck body nevertheless exceeds the volume carrying capacity of the truck body, this can lead to unsafe operation of the truck because, for example, it may cause the centre of mass of the material in the truck body to be above or outside the safe limits for this, and this may cause the truck to become unstable when travelling or dumping. It may also lead to spillage of material, which not only reduces productivity (as spilled material is not transported from the excavation site to the intended dump site), but it may also pose a hazard to personnel and other equipment in the vicinity.

Thus, there is often a desire to try and make the amount of material (by both mass and volume) carried in each truck load as close as possible to the truck's maximum (mass and volume) carrying capacity, but without exceeding the truck's permitted (mass or volume) carrying limit.

Another factor that can affect the amount of material that a given truck is able to transport from an excavation site to a dump site over multiple trips therebetween is so-called "carry-back" (also known as "hang-up"). Carry-back (or "hang-up") occurs when some (or a portion) of the material loaded into and carried in the truck body remains in (and does not exit) the truck body when the truck body is raised (pivoted up) to be emptied at the dump site. The portion or quantity of the material which does not exit the truck body upon dumping therefore remains in the truck body when the truck body is lowered back into the travel position. And as a result, this portion or quantity of the material, which remains in the truck body, is then carried back to the original excavation site (i.e. back to where it came from), or it is carried to the next excavation site (if the truck next travels to a different excavation site), where the truck is to receive its next load.

In geographic locations where material carry-back is a significant issue, the amount of material carried back in a given truck body can also often increase or build up in the truck body from one load to the next or over time.

Material carry-back, as described above, can be a particular problem where the excavated material has a high moisture content and/or otherwise high cohesive and/or adhesive bonding properties, because such excavated materials can have a tendency (or a greater tendency) to stick or bind together, and also to stick to surfaces of the truck body (in the truck body's material carrying area/region/volume). Where the excavated material has a particular tendency to stick together and/or to surfaces of the truck body, this can sometimes lead to quite significant amounts of the material remaining stuck and held to the truck body (and/or building up therein over time), as described above.

Carry-back of material, as described above, has a number of consequent and related problems. For example, because the carried-back material remains in the truck body, this carried-back material is still in the body when the truck receives a fresh load of excavated material at an excavation site. Consequently, because a portion of the volume (and a portion of the truck's weight carrying capacity) is already taken up by the carried-back material, the amount of new material that the truck body can receive and convey in the fresh load is consequently reduced. This therefore reduces the productivity of the truck (i.e. it reduces the total amount of material that the truck actually conveys/transports over time). As an indication of how significant a problem carry-back can be, at some mine site locations, where the moisture levels and/or cohesive and/or adhesive properties of the excavated material are particularly high, the amount of material carried-back can be up to a third, or even more, of the truck body's rated weight carrying capacity. This can even be the case for very large mining trucks with a weight carrying capacity of up to 300 Tonnes or more, so this can mean that up to 100 Tonnes, or possibly even more, of the excavated material remains stuck in the truck body and is carried back to the excavation site, or carried to the next excavation site, per load.

In situations where carry-back occurs, and particularly where it occurs to the degree or to the extreme mentioned in the previous paragraph, often the only way the carried-back material (i.e. the material which is stuck in the truck body) can be removed is "manually". That is, by using separate equipment or machinery to remove it from the truck body. Typically, a dump truck with carried-back material stuck in its tray/body must be diverted (i.e. away from the path/road between the excavation site and the dump site) to a separate location where personnel must use e.g. a separate small or medium-sized excavator (or the like) to reach into the truck body with the excavator's boom and bucket and dig/scrape the "stuck" material out of the truck body and off the surfaces of the truck body. The need to do this, of course, brings additional disadvantages too, for example, because it means significant downtime for the dump truck (i.e. time lost when the truck is not conveying material from the excavation site to the dump site), and it also requires additional machinery and personnel to perform the (unwanted) task of digging/scraping or otherwise removing the carried-back material from the truck body. Another problem is that because this excavating or other equipment, which is used to remove the carried-back material from the truck body, is often located somewhere other than the intended dump site, consequently the material that was stuck in the truck body (and removed therefrom by the excavator or other equipment) becomes dislodged and removed from the truck body at a location other than the intended dump site (i.e. the material ends up on the ground at the location of the separate excavator used to dislodge and remove the material from the truck body), which may in turn mean that that material must be separately reloaded and transported to its intended dump site. Plus, where the degree or severity of material carry-back is like or similar to that given in the extreme example above, it may often be necessary to perform this task of separately or "manually" removing the "stuck" material for most loads, or even every single load, of the truck. It will be appreciated that the reduction in truck productivity, and the resultant financial cost, caused by carry-back can consequently be very significant.

It will also be appreciated that carry-back can lead to increased rates of wear on the truck and its components because the truck is effectively carrying and having to travel with a load (which may be up to a third or more of the truck's rated carrying capacity in some extreme cases) at times when it should be empty/completely unloaded. This can again lead to increased wear and hence a reduced operating life for e.g. the truck's engine/propulsion and drivetrain components, tyres, and it may also lead to increased wear on or depletion of fatigue life for the truck's chassis and suspension and structural components, increased fuel consumption, etc. It may also slow the truck down (compared to the speed at which the truck might travel if completely empty). These factors too, which are caused by or related to the unwanted carry-back of material, can have significant financial costs in terms of the overall cost of producing material from a mine site, or transporting the material on a construction site, etc.

A number of strategies have previously been employed in an attempt to prevent or minimise material carry-back in dump trucks. One such strategy involves using non-stick liner plates which are usually either bolted or welded onto surfaces in the truck body's material/load carrying area/region/volume. These liner plates are typically made from a material that has a lower coefficient of friction compared to the steel from which the truck body itself is made (and in particular a lower coefficient of friction compared to the steel used to form the surfaces defining the truck body's material carrying region/volume). However, because of the severe conditions in which dump truck bodies (and consequently these non-stick liner plates) are used, and particularly due to the severe impacts and abrasions which they experience as material is loaded into the body, as material shifts in the body during loading and transportation, and as material exits the body when the body is raised to "dump" the material out, these non-stick liner plates often fail. This can be a particular problem, not only because it means the liner plates need to be replaced, but the broken plates (or portions thereof) may often become entrained with the excavated material when it is dumped out of the dump truck body and this can lead to the liner plates (or broken portions thereof) becoming entrained in material that may be fed into crushers or the like, which may lead to serious damage and downtime for the crusher. Also, as mentioned above, lost or broken non-stick liner plates must be replaced, and because this cannot be done while the truck is in operation, this requires additional downtime for the truck as well as increased maintenance costs for the new parts and labour. Furthermore, since the non-stick liners are usually bolted or welded onto surfaces in the truck body's material carrying area/region/volume, the maximum amount (by weight) of material that the truck can carry in a single load is reduced by the weight of the liners, and the volume of the liners also reduces the maximum volume of the material that can be loaded into the truck body. This also needs to a reduction in production.

Another strategy that has previously been employed in an attempt to prevent or minimise material carry-back involves the use of a spray-on non-stick coating applied to the inside surfaces of the truck body (that is, the surfaces which define the truck body's material carrying region/volume). The main problem with this is that the coating typically wears off very quickly and therefore must be reapplied, often after only a few loads or even after every single load. The need to reapply the spray-on coating after most loads (or every load) involves significant additional downtime for the truck. Also, the need for personnel to enter the truck body to reapply the spray-on coating creates additional exposure for the personnel to danger. Furthermore, the cost of the spray on coating itself is significant and requires specialist equipment to apply.

It is to be clearly understood that mere reference in this specification to any previous or existing devices, apparatus, products, systems, methods, practices, publications or indeed to any other information, or to any problems or issues, does not constitute an acknowledgement or admission that any of those things, whether individually or in any combination, formed part of the common general knowledge of those skilled in the field or is admissible prior art.

SUMMARY OF THE INVENTION

In one form, although it need not necessarily be the only or broadest form, the invention resides generally in a truck body (or truck tray) which is able to be mounted to a truck in such a way that the truck body can (when mounted to the truck) pivot relative to the truck between a lowered, travel orientation and a raised, dumping orientation, the truck body having a material carrying region, the material carrying region having:
 a floor surface; and
 a curved, or effectively curved, transition ("the floor-to-front-wall-transition") between the floor surface and a surface forming a front wall portion of the material carrying region;

wherein a radius of curvature, or an effective radius of curvature, of at least a portion of the floor-to-front-wall-transition is two (2) meters or greater.

Thus, the invention in the broad form summarised immediately above relates to a truck body. As mentioned in the Background section, a "truck body" (which may also be referred to simply as a "body", or as a "truck tray" or simply a "tray") is the part of a dump truck that receives excavated material (or any other material which is to be transported by the dump truck) and in which the excavated (or other) material is held while being transported by the dump truck.

In relation to the orientations between which the truck body can pivot when mounted to the truck (namely the lowered, travel orientation and the raised, dumping orientation), it is also explained in the Background section above that, on dump trucks, the truck body is typically pivotally attached to the chassis (or to some other frame) of the truck, and an hydraulic (or other) lifting mechanism is usually provided so that, when a dump truck loaded with excavated (or other) material reaches the dump site where the material is to be deposited/unloaded, the truck tray/body can be pivotally raised (tipped up) relative to the rest of the truck. Hence, when the truck body is raised so that the front-end of the body rises relative to the rear end of the body, this causes the excavated (or other) material therein to slide out onto the ground. Thus, the raised, dumping orientation of the truck body is when the truck body is pivoted up to cause the material therein to slide out. The lowered, travel orientation of the truck body is the orientation of the truck body when it is fully lowered relative to the truck. The lowered, travel orientation will normally be the orientation that the truck body is in when it is travelling (whether loaded or unloaded), and also when it is receiving a new load.

In the broad form of the invention summarised above, the truck body has a material carrying region. This is the region of (or the volume created by the shape of) the truck body which can receive and contain the material that is to be transported therein. The floor surface of the material carrying region is a surface that defines the bottom (or at least a portion of the bottom) of the material carrying region. Thus, the floor surface is (at least usually) a generally upwardly-facing surface, and the floor surface is what supports thereon (i.e. it supports from underneath) any material contained in the truck body's material carrying region. The front wall portion and any side wall portions are what stop any material which is contained in the material carrying region of the truck body (supported from below by the floor surface) from falling off or over the front, or off or over the sides, of the floor surface. In other words, the front wall portion is generally upstanding (or upwardly oriented or inclined) relative to the floor surface and its function is to stop any material which is carried in the material carrying region from simply falling or sliding off over the front of the floor surface. Likewise, if the truck body has any side wall portions, these may also be generally upstanding (or upwardly oriented or inclined) relative to the floor surface, and they may also function to stop any material which is carried in the material carrying region from simply falling or sliding off over the relevant side of the floor surface.

As mentioned above, the truck body (when mounted on a truck) is able to pivot relative to the truck between a lowered, travel orientation and a raised, dumping orientation. Therefore, the orientation in space of all parts of the truck body will change if/as the truck body is raised and lowered. Even so, even when the truck body is in the lowered, travel orientation, the floor surface may not necessarily be horizontal. In other words, floor surface (or parts of it) may not necessarily be oriented horizontally (in either the forward-back direction of the truck or the side-to-side direction of the truck) even when the truck body is fully lowered. In fact, in some (possibly many) embodiments, the floor surface (or at least part(s) of it) may slope forward (i.e. towards the front of the truck) when the truck body is in the lowered, travel orientation. This may assist material that is loaded into the truck body to slide forward towards the truck body's front wall portion. Also, the floor surface need not be perfectly flat or planar (i.e. the whole of the floor surface need not be formed as or in a single plane, horizontal or otherwise). Thus, there may be different portions of the floor surface which are oriented differently to other portions. In some embodiments, the floor surface (or part(s) thereof) may have portions which slope inward towards one another from either side of the truck body. This may assist material that is loaded into the truck body to slide or settle towards the centre of the truck body.

At the rear, the floor surface may extend all the way to the very rear of the truck body. Alternatively, there may be one or more differently configured portions between the rear of the floor surface and the very rear of the truck body. As one possible example of this, if the floor surface (or the main part(s) of the floor surface) slope forward towards the forward end of the truck (as mentioned above), the truck body may also have an oppositely (rearwardly) sloping portion, between the rear of the truck body's (forwardly sloping) floor surface and the very rear of the truck body. Such an oppositely sloping portion (which slopes rearward, towards the rear of the truck) located at the rear of the truck body may function e.g. as a spillway to help control the movement of flow of material when the material is being dumped out of the truck body.

In the broad form of the invention described above, a radius of curvature, or an effective radius of curvature, of at least a portion of the floor-to-front-wall-transition is two (2) meters or greater. It is thought that this may help to prevent material from becoming stuck or adhered or bound or clogged up in what can otherwise be quite a tight/sharp corner/angle between the floor surface and the front wall portion of the truck body (i.e. in other truck bodies). Hence, by providing a radius of curvature, or an effective radius of curvature, of at least a portion of the floor-to-front-wall-transition which is two (2) meters or greater, it is thought that the material carry-back problem discussed in the Background section above may be significantly (or at least somewhat) reduced.

By way of further explanation, in the broad form of the invention summarised above:
the floor-to-front-wall-transition is either (i) curved, or (ii) effectively curved; and
at least a portion of the floor-to-front-wall transition has either (i) a radius of curvature of two (2) metres or more, or (ii) an effective radius of curvature of two (2) metres or more.

The references to the possibility that the floor-to-front-wall-transition may be "effectively curved", and also the references to the possibility that at least a portion thereof may have an "effective radius of curvature" which is two (2) metres or more, are references to the fact that the floor-to-front-wall-transition (or the relevant portion thereof) may not necessarily be formed from or with a single, smooth (or perfectly continuous) curve. Instead, the (relevant portion of the) floor-to-front-wall-transition may have an overall curved shape which is created by a number of flat or planar sections or segments or panels (or the like) which are connected to one another in such a way as to define an overall curvature of the (relevant portion of the) floor-to-front-wall-transition. This can be appreciated, for example, with reference to FIGS. 3 and 4 below.

FIG. 3 is an illustration, in cross-section, of the shape of the upper surfaces of the floor surface 310, floor-to-front-wall-transition 320, front wall upper portion 330, and canopy 340, of a truck body in accordance with one possible embodiment of the invention. FIG. 4 is similar to FIG. 3 in that it is also an illustration, in cross-section, of the shape of the upper surfaces of the floor surface 410, floor-to-front-wall-transition 420, front wall upper portion 430, and canopy 440, of a truck body in accordance with an embodiment of the invention. However, FIG. 4 is more of a "zoomed in" close-up view than FIG. 3, focusing on the floor-to-front-wall-transition 420 and the front wall upper portion 430. Hence, only a portion of the floor surface 410, and only a portion of the canopy 440, are shown in FIG. 4 (the rest of the floor surface 410, and the rest of the canopy 440, are cut off in FIG. 4).

The overall shape and curvature of the (upper surface of the) floor-to-front-wall-transition 420 shown in FIG. 4 is similar to the overall shape and curvature of the (upper surface of the) the floor-to-front-wall-transition 320 shown in FIG. 3. However, whereas the floor-to-front-wall-transition 320 shown in FIG. 3 is formed as a single, smooth curve (i.e. it is a continuous curve), the floor-to-front-wall-transition 420 shown in FIG. 4 is formed from a number of discrete (in this case four (4)) flat/planar sections or panels which are joined to one another in such a way as to still define a similar overall curve. (The reason why FIG. 4 is "zoomed in" compared to FIG. 3 is to make these respective separate/discrete flat/planar panels/sections (which make up the floor-to-front-wall-transition 420) more clearly visible. Note also that the short lines (or "dashes") that appear to cross the cross-section of the floor-to-front-wall-transition 420 (and the front wall upper portion 430) in FIG. 4 are simply to highlight the points/edges where the respective flat/planar panels/sections meet and join to one another. These "dashes" are therefore provided on FIG. 4 merely to assist in illustration; they are not actually a part of the truck body in FIG. 4). Hence, the floor-to-front-wall-transition 420 shown in FIG. 4 may be said to be "effectively curved" in a manner similar to the floor-to-front-wall-transition 320 shown in FIG. 3, and hence the floor-to-front-wall-transition 420 shown in FIG. 4 may be said to have an "effective radius of curvature" which is the same as the radius of curvature of the floor-to-front-wall-transition 320 in FIG. 3.

In some embodiments, it may be that, in a cross section (i.e. at least one cross section) of the truck body which is taken in a vertical plane parallel to a direction of forward travel of the truck (if the truck body is or were to be mounted to the truck), the radius of curvature, or the effective radius of curvature, of at least a portion of the floor-to-front-wall-transition is two (2) meters or greater. In other words, in these embodiments, there will be at least one location on (or across the width of) the truck body where, if a cross section is taken in a vertical plane through that location on the truck body and parallel to a direction of forward travel of the truck, the radius of curvature, or the effective radius of curvature, of at least a portion of the floor-to-front-wall-transition in that plane will be two (2) meters or greater. What this means is that, in these embodiments at least, there will not always be a portion of the floor-to-front-wall-transition with a radius of curvature (or an effective radius of curvature) of 2 m or more in all cross sections of (or every cross section across the width of) the truck body taken in all possible vertical planes parallel to a direction of forward travel of the truck. However, in these embodiments, there will be at least a (i.e. one) cross section of the truck body, taken in a vertical plane parallel to the direction of forward travel of the truck, in which the radius of curvature, or the effective radius of curvature, of at least a portion of the floor-to-front-wall-transition is two (2) meters or greater.

However, in other embodiments, it may be that there is always at least a portion of the floor-to-front-wall-transition with a radius of curvature (or an effective radius of curvature) of 2 m or more in all cross sections of (or every cross section across the width of) the truck body taken in all possible vertical planes parallel to the direction of forward travel of the truck. Thus in these other embodiments (different to those described in the previous paragraph), it may be that, in a cross section of the truck body taken in any vertical plane parallel to a direction of forward travel of the truck (if the truck body is or were to be mounted to the truck), the radius of curvature, or the effective radius of curvature, of at least a portion of the floor-to-front-wall-transition is two (2) meters or greater.

In some embodiments, the radius of curvature (or the effective radius of curvature) of the floor-to-front-wall-transition (or a portion thereof) in a first cross section of the truck body taken in a first vertical plane parallel to a direction of forward travel of the truck (if the truck body is or were to be mounted to the truck) may be different to the radius of curvature (or the effective radius of curvature) of the floor-to-front-wall-transition (or a portion thereof corresponding to the portion in the first plane) in another cross section of the truck body taken in another vertical plane parallel to the first vertical plane. In other words, in some embodiments, the size, and shape, and radius (or effective radius) of curvature of the floor-to-front-wall-transition need not necessarily be constant or the same across the whole of (or the whole width of) the floor-to-front-wall-transition, provided there is at least a part or portion of the floor-to-front-wall-transition where the radius of curvature (or the effective radius of curvature) is two (2) meters or greater.

However, despite what is said in the previous paragraph, there may be embodiments in which the shape and curvature, or the shape and effective curvature, of the floor-to-front-wall-transition is substantially uniform across floor-to-front-wall-transition (and across so much of the width of the truck body's material carrying region as the floor-to-front-wall-transition extends, which may be all or most of the width of the material carrying region, although there may be cases where the floor-to-front-wall-transition only extends across some or a part of the total width of the body's material carrying region).

As has been mentioned, in the broad form of the invention presently being described, the floor-to-front-wall-transition is curved (or effectively curved), and at least a portion of the floor-to-front-wall transition has a radius of curvature (or an effective radius of curvature) of two (2) metres or more. The curvature (or effective curvature) can be, although it need not necessarily be, in the form of circular (or effectively circular) curvature. For example, in FIG. 3, the curvature of the floor-to-front-wall-transition 320 is roughly or approximately circular. That is, the curvature of the floor-to-front-wall-transition 320 in FIG. 3 is at least approximately the same shape as a section or arc of a circle. Similarly, in FIG. 4, the effective curvature of the floor-to-front-wall-transition 420 is roughly or approximately circular. That is, the respective panels or segments that form the floor-to-front-wall-transition 420 in FIG. 4 define a shape that is effectively (and at least approximately) the same shape as a section or arc of a circle. However, in comparison with this, in FIG. 5, the curvature of the floor-to-front-wall-transition 520 is much more elliptical (rather than circular). In other words, in FIG. 5, the radius of curvature of the floor-to-front-wall-transition 520 is smaller towards the upper part thereof (near the canopy 540) and the radius of curvature becomes greater moving down the floor-to-front-wall-transition towards the floor surface 510.

In some embodiments (such as those mentioned in [0033] above), whatever shape the curvature of the floor-to-front-wall-transition is (e.g. if viewed in cross section), this may be generally uniform or the same across the width of the floor-to-front-wall-transition. Having said this, there could also be (other) embodiments where the shape and curvature, or the shape and effective curvature, of the floor-to-front-wall-transition is different in different portions of the floor-to-front-wall-transition. In other words, some parts or portions of the floor-to-front-wall-transition may have a different shape and curvature, or a different shape and effective curvature, to others, although there should still be at least a part or portion of the floor-to-front-wall-transition where the radius of curvature, or the effective radius of curvature, is 2 meters or greater.

For the avoidance of doubt, there may of course be embodiments where the radius of curvature, or the effective radius of curvature, of all (i.e. all portions) of the floor-to-front-wall-transition is two (2) meters or greater. Thus, in these embodiments, there may be no (or substantially no) part or portion of (or anywhere on) the floor-to-front-wall-transition which has a radius of curvature, or an effective radius of curvature, of less than two (2) meters.

In some embodiments, the front wall portion of the truck body's material carrying region may be formed (i.e. entirely) by the floor-to-front-wall-transition, or by an upper portion thereof (i.e. by a portion of the floor-to-front-wall-transition which is on the opposite side thereof from the portion which transitions into and/or joins with the floor surface). In other words, it may be that it is (an upper portion of) the floor-to-front-wall-transition itself which forms the whole of the front wall portion of the truck body's material carrying region. This may often be the case for smaller (or smaller capacity) truck bodies. FIGS. 5 is an example of this, namely where it is the floor-to-front-wall-transition 520 itself which forms the front wall portion of the truck body's material carrying region.

However, in other embodiments (often larger sized or larger capacity truck bodies), it may be that the floor-to-front-wall-transition (or an upper portion thereof) forms only part or a portion of the overall front wall portion of the material carrying region, and there may be one or more separate front wall surfaces that form the remainder (upper portion) of the front wall portion of the material carrying region. In this case, a portion of the floor-to-front-wall-transition, which is on the opposite edge thereof from the portion which transitions into and joins with the floor surface, may transition into and join with one or more of these separate (typically flat or planar) front wall surfaces that form the remainder (upper portion) of the front wall portion. FIGS. 2, 3 and 4 provide an example of this, namely where the floor-to-front-wall-transition 120/320/420 forms only part or a portion of the overall front wall portion of the material carrying region, and there are one or more separate front wall surfaces 130/330/430 that form the remainder (upper portion) of the front wall portion of the material carrying region.

Thus, as described in the previous paragraph, there may be embodiments in which the front wall portion of the truck body's material carrying region is formed partly by (an upper portion of) the floor-to-front-wall-transition and partly by at least one separate front wall surface. In these embodiments, a portion of the floor-to-front-wall-transition, which is on the opposite edge thereof from the portion which transitions into and/or joins with the floor surface, may transition into and/or join with the at least one separate front wall surface.

As alluded to above, the truck body may further include a canopy portion. This may be configured to extend over the truck's driver's cabin when the truck body is mounted on the truck and the truck body is in the lowered, travel orientation, to protect the cabin, as is conventional. The canopy portion may extend out from the top (or an upper portion) of the front wall portion in a direction opposite to the direction which the floor surface extends out from the bottom of the front wall portion (or from the bottom of the floor-to-front-wall-transition).

The canopy portion may extend out from the top of the (upper portion of the) floor-to-front-wall-transition. This may be the case where the front wall portion of the truck body's material carrying region is formed (i.e. entirely) by the floor-to-front-wall-transition. In other words, where the floor-to-front-wall-transition extends all the way from the floor to the canopy such that there are no parts or sections or surfaces of the front wall portion that are distinct from the floor-to-front-wall-transition.

Alternatively, the canopy portion may extend out from the top of one or more of the at least one separate front wall surfaces. This may be the case where the front wall portion of the truck body's material carrying region is formed partly by (an upper portion of) the floor-to-front-wall-transition and partly by at least one separate front wall surface.

However, it is to be clearly understood that, despite what is said in the three preceding paragraphs, the truck body need not necessarily include a canopy portion (i.e. at all). There may therefore be embodiments in which the truck body has no canopy portion extending out (forwardly) from the top (or an upper portion) of the front wall portion. This may be the case, for example, for truck bodies used on certain autonomous trucks (i.e. trucks which do not necessarily have a driver's cabin and on which there consequently may be no need for a canopy to protect the driver's cabin.) FIG. 6 provides (in cross-section) an example of an embodiment in which the truck body has no canopy portion.

The at least one separate front wall surface may include a lower portion thereof which is relatively more upright and an upper portion thereof which is more forwardly sloping.

The truck body may further include a curved, or effectively curved, transition ("the floor-to-side-wall-transition") between the floor surface and a surface forming a side wall portion of the material carrying region on one or both sides of the truck body. Therefore, just as the transition between the floor surface and the surface(s) that form the front wall portion of the material carrying region is curved (or effectively curved), the same may be true for the transition between the floor surface and the surface(s) that form the side wall portion(s) on one or both sides of the truck body. However, unlike the floor-to-front-wall-transition, the floor-to-side-wall-transition (on one or both sides of the truck body) does not necessarily need to have (and no portion thereof necessarily needs to have) any particular minimum curvature (or minimum radius of curvature), although the curvature should (preferably) still be as large as feasible (without reducing the truck body's carrying capacity to much) to minimize material carry-back.

In embodiments like the ones referred to in the previous paragraph, on one or both sides of the truck body, the side wall portion of the truck body's material carrying region may be formed (i.e. entirely) by (an upper portion) of the floor-to-side-wall-transition (i.e. by a portion of the floor-to-side-wall-transition which is on the opposite edge of the floor-to-side-wall-transition from the portion thereof which transitions into and joins with the floor surface). In other words, it may be that, on one or both sides of the truck body, it is an upper portion of the floor-to-side-wall-transition itself which forms the whole of the side wall portion of the truck body's material carrying region. However, in other embodiments, it may be that, on one or both sides of the truck body, an upper portion of the floor-to-side-wall-transition forms only part or a portion of the overall side wall portion of the material carrying region, and there may be one or more separate side wall surfaces that form the remainder (upper portion) of the side wall portion on that side of the material carrying region. In this latter case, on the relevant side(s), a portion of the floor-to-side-wall-transition, which is on the opposite edge thereof from the portion which transitions into and/or joins with the floor surface, may transition into and join with one or more of these separate side wall surfaces that form the remainder of the side wall portion on that side. Thus, on one or both sides of the truck body, the side wall portion of the truck body's material carrying region may be formed partly by (an upper portion of) the floor-to-side-wall-transition and partly by at least one separate side wall surface, and, on one or both sides of the truck body, a portion of the floor-to-side-wall-transition, which is on the opposite edge thereof from the portion which transitions into and joins with the floor surface, may transition into and joins with the at least one separate side wall surface. Typically, there will be a curved, or effectively curved, transition ("a floor-to-side-wall-transition") between the floor surface and the surface forming the side wall portion of the material carrying region on both sides of the truck body.

The truck body may also include curved, or effectively curved, transition ("the side-wall-to-front-wall-transition") between the front wall portion of the material carrying region and the side wall portion on one or both sides of the truck body. Typically, there will be a curved, or effectively curved, transition ("a side-wall-to-front-wall-transition") between the front wall portion of the material carrying region and the side wall portions on both sides of the truck body.

The truck body may additionally include a part or feature configured to prevent or reduce the formation of a sharp or tight corner at the junction between any two or more of the following: the floor-to-front-wall-transition, the floor-to-side-wall-transition, and side-wall-to-front-wall-transition. The said part or feature may take the form of a corner infill plate.

Any of the features described herein can be combined in any combination with any one or more of the other features described herein within the scope of the invention.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of Invention in any way. The Detailed Description will make reference to a number of drawings as follows:

FIG. 2 illustrates the shape of the upper surfaces of the portions of the truck body just mentioned, in a cross section taken in the plane labelled P in FIG. 1.

FIG. 3 represents a truck body having a different configuration to the truck body of FIGS. 1 and 2).

FIG. 4 represents a truck body having a different configuration to the truck bodies of FIG. 1-2, and FIG. 3, respectively). Furthermore, FIG. 4 is more of a "zoomed in" close-up view than FIG. 1-2 or 3, focusing on the floor-to-front-wall-transition and the front wall upper portion.

FIG. 5 represents a truck body having a different configuration to the truck bodies of FIGS. 1-2, 3, and 4, respectively).

FIG. 6 represents a truck body having a different configuration to the truck bodies of FIGS. 1-2, 3, 4 and 5, respectively).

DETAILED DESCRIPTION

Figure 1:
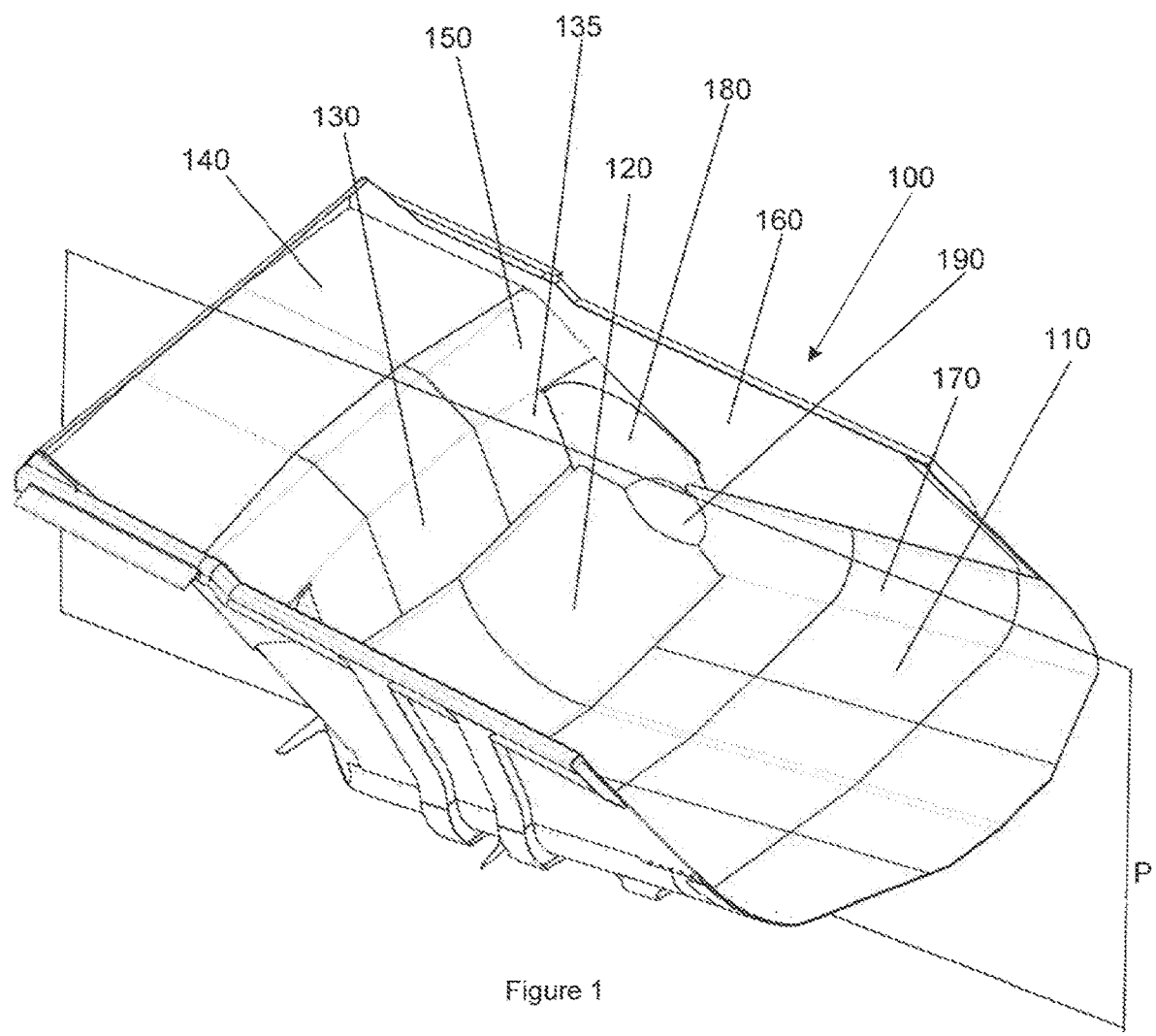
FIG. 1 is a perspective view, from above and slightly to one side and behind, of a truck body in accordance with one possible embodiment of the invention.

As mentioned above, FIG. 1 is a perspective view, from above and slightly to one side and behind, of a truck body in accordance with one possible embodiment of the invention. The truck body in FIG. 1 is designated by reference numeral 100.

The truck body 100 is able to be mounted to a truck in such a way that it can be pivoted relative to the truck between a lowered, travel orientation and a raised, dumping orientation. FIG. 1 also shows that the truck body 100 has a clearly defined material carrying region (into which material to be transported in the truck body can be received), although the material carrying region is not independently labelled.

It can also be seen from FIG. 1 that the truck body 100 includes: a floor surface 110; a curved floor-to-front-wall-transition 120; a front wall upper portion 130 (note: this front wall upper portion 130 includes an upper section 150 thereof that slopes more forwardly than the more upright lower section 135 thereof); a canopy 140; a side wall 160 on either side; a curved floor-to-side-wall-transition 170 joining the floor surface 110 to the sidewall 160 on either side; a curved side-wall-to-front-wall-transition 180 joining the lower section 135 of the front wall upper portion 130 to the sidewalls 160 on either side; and an infill plate 190 on either side (only one of the infill plates is visible in FIG. 1).

Figure 2:
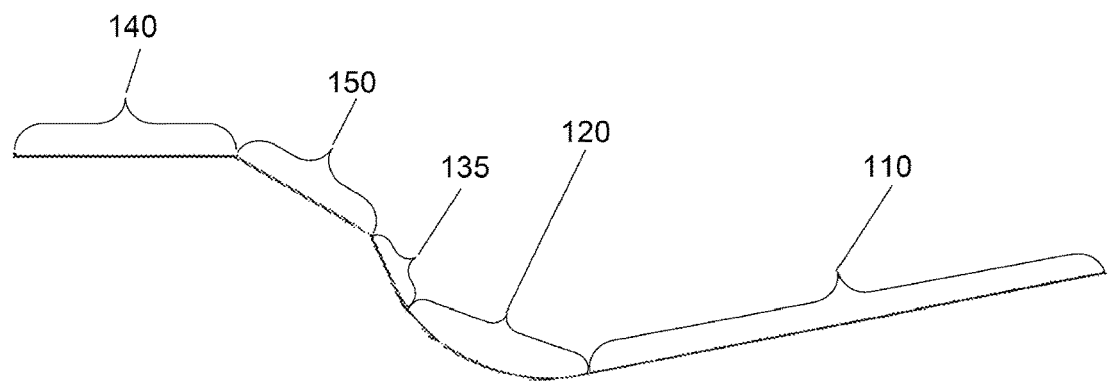
FIG. 2 is an illustration, in cross-section, of the shape of the upper surfaces of the floor surface, floor-to-front-wall-transition, front wall upper portion, and canopy, of the truck body in the embodiment in FIG. 1. Specifically.
Figure 3:
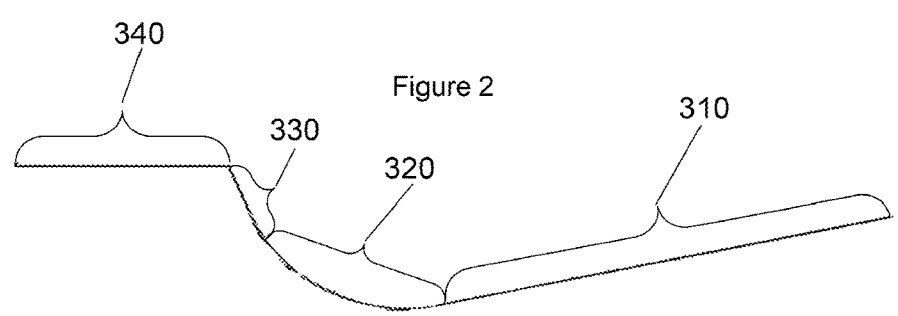
FIG. 3 is similar to FIG. 2 in that it is an illustration, in cross-section, of the shape of the upper surfaces of the floor surface, floor-to-front-wall-transition, front wall upper portion, and canopy, of a truck body; however FIG. 3 corresponds to a different embodiment of the invention than FIGS. 1 and 2 (i.e.
Figure 4:
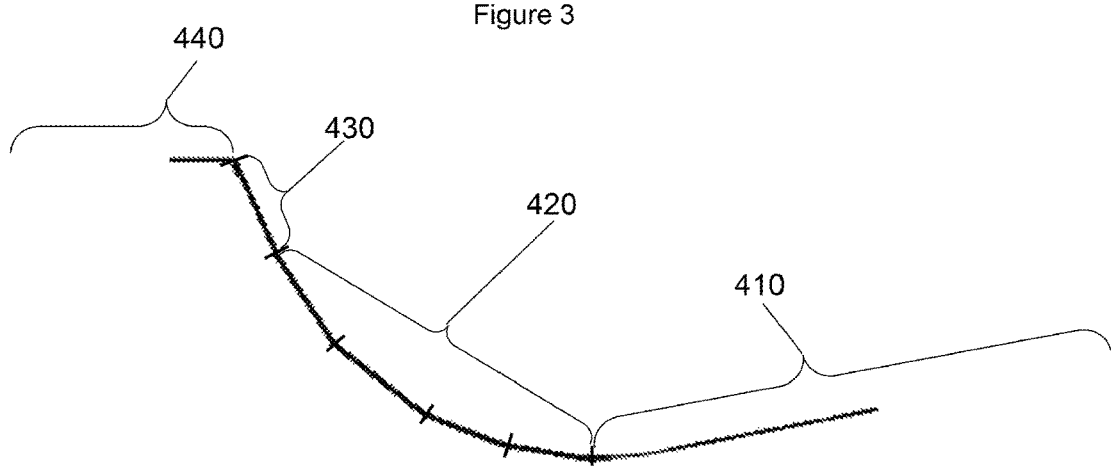
FIG. 4 is also similar to FIGS. 2 and 3 in that it too is an illustration, in cross-section, of the shape of the upper surfaces of the floor surface, floor-to-front-wall-transition, front wall upper portion, and canopy, of a truck body; however FIG. 4 corresponds to a different embodiment again of the invention to FIGS. 1-2, and 3 (i.e.

As mentioned above, FIG. 2 illustrates the shape of the upper surfaces of certain portions of the truck body in FIG. 1, in a cross section taken in the plane P in FIG. 1. As can be seen from FIG. 2, even when the truck body 100 is in the lowered, travel orientation (as represented in FIG. 2), the floor surface 110 is not horizontal. Rather, the floor surface 110 is higher at its rear and lower at its front such that it slopes forward (i.e. towards the front of the truck). This may assist material that is loaded into the truck body 100 to slide forward towards the truck body's front wall portion.

Also, as shown in FIG. 1, the floor surface 110 is not all formed in a single plane. Rather, the opposed sides of the floor surface 110 (i.e. the portions of the floor surface 110 on either side of a longitudinal centre line of the truck body) slope inward towards one another. This may assist material that is loaded into the truck body to slide or settle towards the centre of the truck body.

The floor-to-front-wall-transition 120 is located in between, and it joins, the front of the floor surface 110 and the bottom of the (lower section 135 of the) front wall upper portion 130. The floor-to-front-wall-transition 120 actually also has two parts. These two parts of the floor-to-front-wall-transition 120 are visible in FIG. 1 but the two-parts are not independently labelled. Basically, the two parts of the floor-to-front-wall-transition 120 extends to either side of the truck body's longitudinal centre line, and the two parts of the floor-to-front-wall-transition 120 slope slightly inward towards one another in the same way as the portions of the floor surface 110 on either side of the body's longitudinal centre line. Aside from being slightly sloped relative to one another, the two parts of the floor-to-front-wall-transition 120 are substantially the same (or mirror images of one another) in shape.

In the embodiment in FIG. 1, the whole of the floor-to-front-wall-transition 120 (on both parts thereof) has a radius of curvature of 2 m or more. In other words, in the embodiment in FIG. 1, there are no parts or portions anywhere on the floor-to-front-wall-transition 120 where the radius of curvature is less than 2 m. Thus, FIG. 1 provides an example of an embodiment in which the size, and shape, and radius of curvature, of the floor-to-front-wall-transition 120 is substantially uniform across the whole of the floor-to-front-wall-transition. It is also an example of an embodiment in which the curvature of the floor-to-front-wall-transition is (approximately) circular in shape. This may be contrasted with the shape of the floor-to-front-wall-transition 520 in FIG. 5 which, as explained above, has a curvature that is more elliptical (rather than circular) in shape.

FIG. 1 also provides an example of an embodiment in which the floor-to-front-wall-transition 120 forms only part of the overall front wall portion of the material carrying region, and where there are separate front wall surfaces that form the remainder of the front wall portion of the material carrying region. More specifically, an upper portion of the floor-to-front-wall-transition 120, which is on the opposite edge thereof from the portion which transitions into and/or joins with the floor surface 110, transitions into and/or joins with the bottom of the front wall upper portion 130. Note that, as mentioned above, the front wall upper portion 130 includes an upper section 150 thereof that slopes more forwardly than the more upright (but still forwardly-sloping) lower section 135 thereof that transition into and/or joins with the upper portion of the floor-to-front-wall-transition 120. The front wall upper portion 130 (including the upper section 150 thereof and the lower section 135 thereof) is actually made from three parts in the truck body's width direction—one part is in the middle (this middle part therefore extends across the truck body's longitudinal centre line) and there are parts on either side of this middle part. Within each of these three parts of the front wall upper portion 130, including the upper section 150 and also the lower section 135, are all formed with respective flat/planar surfaces.

As mentioned above (and as clearly shown in FIGS. 1 and 2), the truck body 100 also includes a canopy 140. FIG. 1 actually shows that the canopy 140 is also made from three parts in the truck body's width direction—one part is in the middle (this middle part therefore extends across the truck body's longitudinal centre line) and there are parts of the canopy 140 on either side of this middle part. Each of these three parts of the canopy 140 is also formed with a respective flat/planar upper surface.

Figure 5:
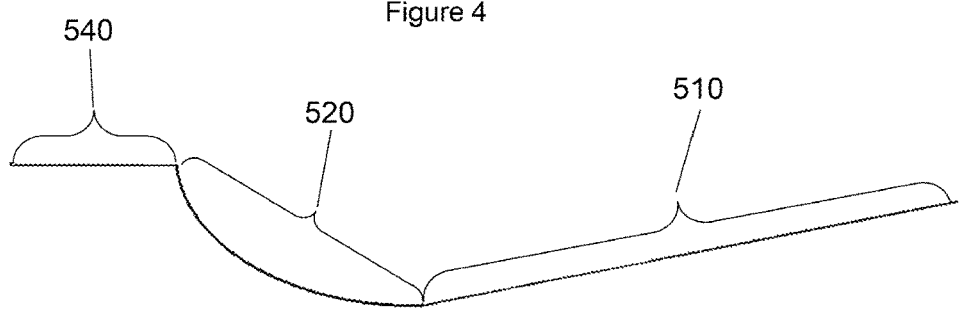
FIG. 5 is, once again, similar to FIGS. 2-4 in that it is again an illustration, in cross-section, of the shape of the upper surfaces of the floor surface, floor-to-front-wall-transition, and canopy, of a truck body; however FIG. 5 corresponds to yet a different embodiment again of the invention to FIGS. 1-2, FIG. 3 and FIG. 4 (i.e.
Figure 6:
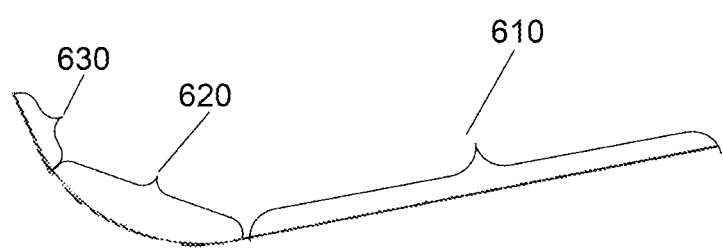
FIG. 6 is, yet again, similar to FIGS. 2-5 in that it is again an illustration, in cross-section, of the shape of the upper surfaces of the floor surface, floor-to-front-wall-transition, and front wall upper portion, of a truck body; however FIG. 6 corresponds to yet a different embodiment again of the invention to the other Figures (i.e.

The embodiment in FIGS. 1 (and 2) is actually an example of an embodiment in which the canopy extends out from the top of the separate front wall surfaces (as opposed to extending out from the top of the floor-to-front-wall-transition, as would be the case if there were no separate front wall surfaces like 135 and 150 like in FIG. 5 for example). In FIGS. 1 and 2, the canopy 140 actually extends out forwardly from the upper edges of the upper section 150 of the front wall upper portion 130.

The truck body 100 also has a pair of curved floor-to-side-wall-transitions 170, one on either side, and these join the floor surface 110 to the respective sidewalls 160 on either side. As shown in FIG. 1, the radius of curvature of each of the floor-to-side-wall-transitions 170 is less than the radius of curvature on the floor-to-front-wall-transition 120. The reason for this is because it is believed that a primary location where material can initially become stuck or bound in the material carrying region of a truck body, or a primary initiation point where this can begin and which can then in turn lead to further adhesion or build up (and hence carry-back)), is in or near the corner/join/junction between the front wall and the floor surface. This is therefore why the present invention provides a floor-to-front-wall-transition (120 in this embodiment) with a minimum radius of curvature (at least in a portion thereof) of 2 m or more. The corner/join/junction between each of the side walls and the floor is thought to be slightly less of a problem (or slightly less of an initiation point) for material carry-back, and this is why the floor-to-side-wall-transition 170 is not necessarily required to have any particular minimum radius of curvature, and this is also why the radius of curvature of the floor-to-side-wall-transitions 170 (on either side) can be somewhat smaller than that of the floor-to-front-wall-transition 120. Nevertheless, by providing a floor-to-side-wall-transition 170 on either side which is curved (and with a curvature/radius of curvature that is still quite large, if not necessarily as large as that of the floor-to-front-wall-transition 120), it is thought that material carried-backed may be further reduced, by preventing material from becoming caught or bound at the corner between the floor surface 110 and each of the sidewalls 160.

FIG. 1 actually provides an example of an embodiment in which, on both sides of the truck, the sidewall portion of the truck body's material carrying region is formed partly by a portion of the floor-to-side-wall-transition 170 and partly by separate side wall surfaces 160.

The truck body 100 also has a curved side-wall-to-front-wall-transition 180 joining the respective outside edges of the front wall upper portion 130 (or the lower section 135 thereof) to the respective sidewalls 160 on either side. It is thought that, again, the provision of a side-wall-to-front-wall-transition 180 on either side which is curved may help prevent material carry-back, by preventing material from becoming caught or bound at the corners between the sides of the front wall upper portion 130 and the respective sidewalls.

FIG. 1 also shows an infill plate 190. The truck body 100 actually has two infill plates 190, namely the one visible in FIG. 1, and another one which is not visible but which is of exactly the same configuration and mounted at exactly the same location (in the mirror image location) on the opposite side of the truck body. More specifically, each infill plate 190 is mounted at the junction between the floor-to-front-wall-transition 120, the floor-to-side-wall-transition 170, and the side-wall-to-front-wall-transition 180, on the relevant side of the truck body. The purpose of each infill plate 190 is to prevent or reduce the formation of a sharp or tight corner at this junction which might otherwise allow material to become caught or bound therein and lead to material carry-back.

It is important to note that the way in which the truck body 100 is constructed is such that the various portions of the truck body 100 which are curved as described above to help prevent the build-up or adhesion of material (in what might otherwise be tight corners or junctions of the truck body), including the floor-to-front-wall-transition 120, the floor-to-side-wall-transition 170 and the side-wall-to-front-wall-transition 180, are all integral parts of the overall structure of the truck body. That is to say, these various curved portions (or the parts of the truck body that provide these curved surfaces) are not simply welded or bolted or otherwise added on as an addition to, or on top of, existing or underlying surfaces or structures of the truck body. This therefore means that the provision of these curved features (as integral parts (rather than additional or add-on parts) of the structure of the truck body) does not significantly add (if at all) to the overall weight of the truck body (compared to other existing truck body designs of similar size and capacity), and this in turn means that the weight of the present truck body 100 remains comparable to that of other existing truck bodies (of similar size and capacity) that do not have these curved features.

Furthermore, the provision of these curved features has been achieved without significantly (if at all) reducing the volumetric carrying capacity of the truck body's material carrying region. Accordingly, the provision of these curved features does not significantly (if at all) reduce the payload (weight and volume) carrying capacity of the truck body compared to other existing truck bodies of equivalent size and capacity.

There are also some additional points that are worth noting about the reason why, it is thought, the present invention (as represented by the example embodiment in FIG. 1) may help to prevent or reduce material carry-back (and therefore also the associated problems this gives rise to).

For one thing, as mentioned (or alluded to) above, it is thought that one of the primary initiation points where material (particularly cohesive material) may initially become stuck in other/existing truck bodies (which may the lead to further material being stuck and carried back) is at the bottom of the truck body's front wall (i.e. where the front wall joins to the front of the floor in existing/other truck body designs), and also at the front corners (i.e. the respective corners where the front wall, floor and side wall meet on either side in existing/other truck body designs). The present invention, as represented by the embodiment in FIG. 1 in particular, has features which are intended to address and help prevent material from becoming stuck and/or from building up in these areas.

For instance, it is thought that the large radius of the floor-to-front-wall-transition 120 may help to smooth the transition or junction between the front wall 130 and the floor surface 110. It is also thought that this may therefore enable material in the truck body to flow/move much more freely over or past this floor-to-front-wall-transition 120 e.g. when the truck body is raised up to be emptied/dumped, compared to the more sharply angled corner or junction often present at this location in other/existing truck body designs which material cannot flow over or past easily and in which material often therefore becomes stuck in existing designs.

It is also thought that this ability of the material to flow more freely over or past the floor-to-front-wall-transition 120 may have two consequent effects. Firstly, this may (it is thought) help prevent material hang-up (i.e. carry-back) from initiating at the junction between the floor surface and the front wall in the first place. And secondly, it is thought that because material may be able to travel or flow more easily or freely over or past the floor-to-front-wall-transition 120 (e.g. when the material is being dumped), this flowing/moving material may consequently move with increased or higher flow velocity (speed) and momentum. Therefore, if there is any material that happens to have become adhered or stuck to a surface of the truck body in this region, the flowing material may strike this (or travel over of across it, contacting it and abrading it as it does so) with greater force, and this may therefore be more likely to help dislodge and remove the stuck material.

Additionally, the curved floor-to-front-wall-transition, due to its curvature (or effective curvature), does not provide a single, large planar surface to which material can easily adhere or become stuck. Therefore, compared to a single, large planar front wall surface (or the like) which extends all (or most of) the way to the floor, the curved floor-to-front-wall-transition reduces the size of the flat, planar surface of the front wall, and hence reduces the total bonding force (or the ability for such a bonding force to be formed or established) between the material and any planar surface of the front wall of the truck body.

It is thought that, at least in general, the larger the radius of the floor-to-front-wall-transition, the more effective it will be in reducing material carry-back (particularly carry-back that might otherwise be associated with or initiated by material that becomes stuck in the junction between the front wall and the floor). It is further thought that, at a minimum, this radius (at least for a portion of the floor-to-front-wall-transition) should be 2 m, regardless of the size of the truck body, but the radius may often be increased to larger than this depending on application and truck (truck body) size.

Whilst the radius of curvature of at least a portion of the floor-to-front-wall-transition should be two meters or greater, and whilst it may often be that the radius/size of the curvature is increased to larger than this (to help better combat or reduce material carry-back), this may often need to be balanced against the fact that increasing the size of the radius/curvature of the floor-to-front-wall-transition more may begin to reduce the overall volume or capacity of the material carrying region of the truck body. There may often therefore need to be a trade-off. Nevertheless, if the size of the curvature of the floor-to-front-wall-transition is made even larger, it may sometimes be possible to make adjustments to other dimensions or geometric parameters of the truck body to counter any loss or reduction in capacity due to the increased curvature. For example, it may sometimes be possible to slightly reduce the angle of inclination of the floor surface (i.e. making the floor closer to horizontal, which may gain back a little volume), although this may affect the clearance between the back of the tray and the ground when dumping, so there may be limits on this too. Another possibility might be to increase the height of the side walls, but this may raise the overall height of the truck body, and the potential center of mass of the payload, which may have stability ramifications. In any case, these kinds of design/configuration trade-offs are a normal part of the design process for designing a truck body.

One of the reasons (it is thought) why the bottom of the front wall (i.e. where the front wall joins to the front of the floor in existing truck body designs), and also the front corners (i.e. where the front wall, floor and side wall meet on either side in existing truck body designs) are primary initiation points where material can initially become stuck leading to carry-back is because, during dumping, material flows out of the truck body, with the material located in (or towards) the rear of the truck body exiting before the material that is located closer to the front of the truck body. Consequently, very often the last point of contact (i.e. the last place where material remains stationary and in contact with the surface(s) of the truck body at or near the end of the dumping process) is at (or around) the front wall of the truck body. Therefore, if some of this last material is 'stuck' at the front wall towards the end of the dump cycle, there may be little or no subsequent material to collide with it to provide an impact or force to dislodge and remove the 'stuck' material. Therefore, once carry-back has thus initiated in this area in this way, the volume of 'stuck' material often also tends to grow or increase with successive loads and dump cycles, because the material-to-material bond (which leads to additional material in subsequent loads becoming stuck on the initially-adhered material) is often even greater than the bond between material-to-metal (which is what caused the initially-adhered material to become stuck). Therefore, another way in which it is thought the present invention may help to reduce this is due to the fact that, as a result of the provision of the curved floor-to-front-wall-transition, the total surface area of the flat front wall (if there is any such flat surface of the front wall) is comparatively reduced. Since the total cohesive force acting between the material and the truck body surface is generally proportional to the surface area of the bond therebetween, by reducing the amount of (flat, uninterrupted) surface to which material can become more easily adhered/bonded, it becomes easier for the flow of material to dislodge and remove any material that may have become stuck. The fact that, on the front wall upper portion 130, the upper section 150 is sloped relatively more forwardly than the lower section 135 may also assist in this regard, because material may initially flow down from (or over) the upper section 150 before then continuing to flow down and over the lower section 135, and this flow coming off the upper section 150 may help to dislodge any material that may have become stuck on the lower section 135 (e.g. due to the often higher pressure imposed on the material in contact with the lower section 135 by the greater amount and weight of material above during loading and transportation the like).

As also mentioned above, in the embodiment in FIG. 1, a corner in-fill plate 190 is provided (on either side) to fit over the 3-way joint between the floor-to-front-wall-transition 120, the floor-to-side-wall-transition 170, and side-wall-tofront-wall-transition 180. This plate 190 (each of them) reduces the sharp angle in this corner reign of the truck body, which in-turn also helps to increase flow velocity of material in this area and prevent material build up.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A truck body which is able to be mounted to a truck in such a way that the truck body can pivot relative to the truck between a lowered, travel orientation and a raised, dumping orientation, the truck body having a material carrying region, the material carrying region having:
   a floor surface,
   a front wall comprising one or more substantially planar surface portions,
   a curved floor-to-front-wall transition between the floor surface and the front wall,
   on both sides of the truck body, a curved floor-to-side-wall transition between the floor surface and a surface forming a side wall of the material carrying region; and
   on both sides of the truck body, a curved side-wall-to-front-wall transition between at least a part of the front wall and at least a part of the side wall,
   wherein in any cross section of the floor-to-front-wall transition taken in a vertical plane parallel to a direction of forward travel of the truck, a radius of curvature of the floor-to-front-wall transition is two meters or greater.

2. A truck body as claimed in claim 1, wherein the radius of curvature of the floor-to-front-wall transition in a first cross section taken in a first vertical plane parallel to a direction of forward travel of the truck is different to the radius of curvature of the floor-to-front-wall transition in another cross section taken in another vertical plane parallel to the first vertical plane.

3. A truck body as claimed in claim 1, wherein the floor-to-front-wall transition comprises two parts with one part on either side of a longitudinal centre of the truck body, and the shape and curvature of each part of the floor-to-front-wall transition is substantially uniform along its length.

4. A truck body as claimed in claim 1, wherein a front portion of the truck body's material carrying region is formed partly by the floor-to-front-wall transition and partly by the one or more substantially planar surface portions of the front wall.

5. A truck body as claimed in claim 4, wherein a portion of the floor-to-front-wall transition, which is on an opposite edge thereof from a portion thereof which transitions into the floor surface, transitions into the one or more substantially planar surface portions of the front wall.

6. A truck body as claimed in claim 4, wherein the truck body further includes a canopy, the canopy extending out from the top of the front portion in a direction opposite to a direction in which the floor surface extends out from the bottom of the front portion.

7. A truck body as claimed in claim 6, wherein the canopy extends out from the top of the one or more substantially planar surface portions of the front wall.

8. A truck body as claimed in claim 7, wherein the front wall includes a lower section and an upper section, both of which comprise one or more substantially planar surface portions, wherein the lower section is relatively more upright than the upper section, and the upper section is more forwardly sloping than the lower section.

9. A truck body as claimed in claim 1, wherein, on both sides of the truck body, a side portion of the truck body's material carrying region is formed partly by the floor-to-side-wall transition and partly by at least one side wall surface.

10. A truck body as claimed in claim 1, further including a part or feature configured to prevent or reduce the formation of a sharp or tight corner at a junction between any two or more of the following: the floor-to-front-wall transition, either of the floor-to-side-wall transitions, and either of the side-wall-to-front-wall transitions.

11. A truck body as claimed in claim 10, wherein the said part or feature comprises two infill plates, one on each side of the truck body, and wherein each infill plate is mounted at a junction between the floor-to-front-wall transition, the floor-to-side-wall transition and the side-wall-to-front-wall transition on the relevant side of the truck body, and each infill plate is configured to prevent or reduce the formation of a sharp or tight corner at the said junction on its side of the truck body.

12. A truck body as claimed in claim 1, wherein the floor surface has portions which slope inward towards one another from either side of the truck body.

13. A truck body as claimed in claim 4, wherein the front wall includes a lower section thereof which is relatively more upright and an upper section thereof which is more forwardly sloping.

* * * * *